United States Patent
Bathiya

(10) Patent No.: US 11,010,723 B2
(45) Date of Patent: *May 18, 2021

(54) CONFLICT MANAGEMENT IN SCHEDULING MEETINGS

(71) Applicant: International Business Machines Corporation, Armonk, NY (US)

(72) Inventor: Mayank B. Bathiya, Jamnagar (IN)

(73) Assignee: International Business Machines Corporation, Armonk, NY (US)

( * ) Notice: Subject to any disclaimer, the term of this patent is extended or adjusted under 35 U.S.C. 154(b) by 835 days.

This patent is subject to a terminal disclaimer.

(21) Appl. No.: 15/469,902

(22) Filed: Mar. 27, 2017

(65) Prior Publication Data

US 2017/0200130 A1    Jul. 13, 2017

Related U.S. Application Data

(63) Continuation of application No. 14/529,302, filed on Oct. 31, 2014, now Pat. No. 9,626,660, which is a continuation of application No. 14/271,807, filed on May 7, 2014, now Pat. No. 9,626,659.

(51) Int. Cl.
*G06Q 10/10* (2012.01)
*G06Q 10/06* (2012.01)

(52) U.S. Cl.
CPC ... *G06Q 10/1095* (2013.01); *G06Q 10/06312* (2013.01); *G06Q 10/063116* (2013.01); *G06Q 10/109* (2013.01); *G06Q 10/0631* (2013.01); *G06Q 10/06311* (2013.01); *G06Q 10/1093* (2013.01)

(58) Field of Classification Search
CPC .. G06Q 10/1095; G06Q 10/109; G06Q 10/06; G06Q 10/10; G06Q 30/06; G06Q 10/1093; G06Q 10/02; G06Q 10/06311; G06Q 10/0631; G06Q 10/063114; G06Q 10/063116; G06Q 10/06312
See application file for complete search history.

(56) References Cited

U.S. PATENT DOCUMENTS

| 7,343,312 | B2 | 3/2008 | Capek et al. |
| 8,086,478 | B2 | 12/2011 | Chen et al. |
| 8,375,034 | B2 | 2/2013 | Norton et al. |
| 2003/0149606 | A1 | 8/2003 | Cragun et al. |
| 2003/0220826 | A1 | 11/2003 | Mansour |
| 2004/0093290 | A1 | 5/2004 | Doss et al. |

(Continued)

OTHER PUBLICATIONS

IBM, "Flexible calendar scheduling system", An IP.com Prior Art Database Technical Disclosure, Original Publication Date: Dec. 21, 2009, IP.com No. IPCOM000191209D, IP.com Electronic Publication: Dec. 21, 2009, pp. 1-3.

(Continued)

*Primary Examiner* — Maryam M Ipakchi
(74) *Attorney, Agent, or Firm* — Stephen R. Yoder

(57) ABSTRACT

A floating meeting is set up such that the actual meeting time is not fixed until after pre-defined parameters are satisfied. One parameter is a point in time nearer to the proposed meeting date(s) than the time of the original meeting invitation. At the later point in time, subsequent and potentially conflicting meetings are automatically avoided to maximize invitee availability or otherwise meet a meeting organizer's objective.

18 Claims, 5 Drawing Sheets

(56) References Cited

U.S. PATENT DOCUMENTS

| | | |
|---|---|---|
| 2006/0129444 A1 | 6/2006 | Baeza et al. |
| 2006/0200374 A1* | 9/2006 | Nelken ............... G06Q 10/109 |
| | | 705/7.19 |
| 2006/0293943 A1 | 12/2006 | Tischhauser et al. |
| 2008/0140488 A1 | 6/2008 | Oral et al. |
| 2009/0177503 A1 | 7/2009 | Kawano et al. |
| 2009/0281860 A1 | 11/2009 | Bhogal et al. |
| 2010/0180212 A1 | 7/2010 | Gingras et al. |
| 2011/0054976 A1 | 3/2011 | Adler et al. |
| 2012/0296982 A1 | 11/2012 | Heyman et al. |
| 2013/0204653 A1 | 8/2013 | Herger et al. |
| 2013/0218622 A1 | 8/2013 | MacKenzie et al. |
| 2013/0246526 A1 | 9/2013 | Wu et al. |
| 2013/0298043 A1 | 11/2013 | Bailey |
| 2014/0229560 A1 | 8/2014 | Gray |
| 2015/0324754 A1 | 11/2015 | Bathiya |
| 2015/0324755 A1 | 11/2015 | Bathiya |

OTHER PUBLICATIONS

"Schedule a Meeting Using iCal", Stanford | IT Services, last modified Feb. 3, 2012, <https://itservices.stanford.edu/service/emailcalendar/desktop/applemail/ical_schedulemtg>.

"The system or method to faciliate meeting scheduling by providing multiple meeting time-slots", An IP.com Prior Art Database Technical Disclosure, Authors et. al.: Disclosed Anonymously, IP.com No. IPCOM000231009D, IP.com Electronic Publication: Sep. 22, 2013, pp. 1-3.

"Using Outlook's Autopick Next and Suggested Times", Last reviewed on Aug. 12, 2013, <http://www.slipstick.com/outlook/calendar/using-outlooks-autopick-next-and-suggested-times/>.

Appendix P List of IBM Patents or Applications Treated as Related. Dated Mar. 24, 2017. Two pages.

Original U.S. Appl. No. 14/529,302, filed Oct. 31, 2014.

Original U.S. Appl. No. 14/271,807, filed May 7, 2014.

\* cited by examiner

CALENDAR ENTRY | SEND

TYPE: DELAYED - DECISION MEETING

SUBJECT: WEEKLY MEETING WITH EMILY

OPEN TIMESLOT: 12:00 PM TO 5:00 PM

ADDITIONAL REQUEST DATA

- ☑ REPEATS: EVERY WEDNESDAY FOR 6 MONTHS
- ☑ DURATION: 30 MINUTES
- ☑ DEFAULT TIMESLOT: 2:00 PM TO 2:30 PM
- ☑ SUGGESTION POINT:
  2 DAYS BEFORE MEETING DATE AT 5:00 PM
- ☐ RESOURCES
- ☐ DECISION POINT: 1 DAY BEFORE MEETING DATA AT 10:30 AM

INVITEES: EMILY

NOTES:

MEETING IN MY OFFICE

FIG. 5

CONFLICT MANAGEMENT IN SCHEDULING MEETINGS

FIELD OF THE INVENTION

The present invention relates generally to the field of calendaring systems, and more particularly to event scheduling conflict management.

BACKGROUND OF THE INVENTION

Calendaring systems have formed the core component of personal information management software and firmware applications for decades. Initially, a mere calendar display, modern calendaring systems provide scheduling and alarm functions in addition to full integration with contact management. The typical calendaring application minimally provides a mechanism for scheduling an event to occur on a certain date at a certain time. Generally, the event can be associated with a textual description of the event. Calendaring systems typically allow a user to manage shared events, referred to generally as meetings. Electronic calendaring software allows groups of users to negotiate around the scheduling of a proposed event, such as a meeting, with the goal of selecting a time that allows most of the users to attend.

SUMMARY

Embodiments of the present invention disclose a method, computer program product, and system. A first computer system receives a meeting dataset for a proposed meeting, the meeting dataset including a pre-defined period before an earliest occurrence of the proposed meeting, a meeting duration, and a plurality of timeslots, each timeslot of the plurality of timeslots having an individual duration equal to the meeting duration. The first computer system, responsive to a user accepting a meeting invitation for the proposed meeting, tentatively booking the plurality of timeslots in a calendar associated with the user. The first computer system determining a set of available timeslots from the plurality of timeslots responsive to automatically accessing the calendar at the pre-defined period before an earliest occurrence of the proposed meeting. The first computer system finally booking a single timeslot from the plurality of timeslots on the calendar based on the set of available timeslots.

BRIEF DESCRIPTION OF THE SEVERAL VIEWS OF THE DRAWINGS

FIG. 5 is a first screenshot according to an embodiment of the present invention.

DETAILED DESCRIPTION

Figure 1:
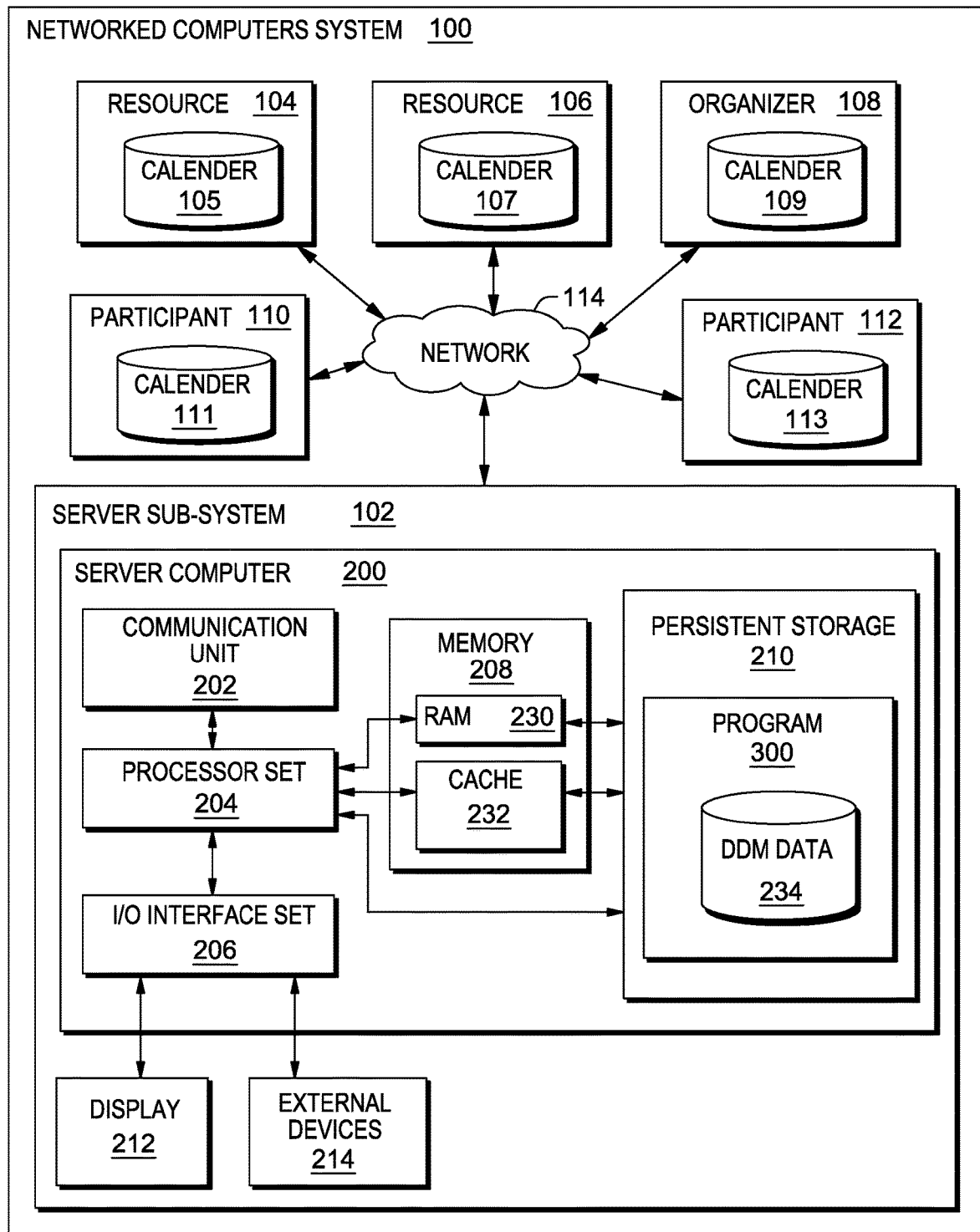
FIG. 1 is a schematic view of a first embodiment of a system according to the present invention.

A floating meeting is set up such that the actual meeting time is not fixed until after pre-defined parameters are satisfied. One parameter is a point in time nearer to the proposed meeting date(s) than the time of the original meeting invitation. At the later time, subsequent and potentially conflicting meetings are automatically avoided to maximize invitee availability. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a networked computers system, generally designated 100, in accordance with one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: server sub-system 102; resource sub-systems 104, 106; organizer sub-system 108; participant sub-systems 110, 112; calendar data stores 105, 107, 109, 111, 113, communication network 114; server computer 200; communication unit 202; processor set 204; input/output (I/O) interface set 206; memory device 208; persistent storage device 210; display device 212; external device(s) 214; random access memory (RAM) devices 230; cache memory device 232; program 300; and delayed-decision meeting (DDM) data store 234.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between computer sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Program 300 operates to set up delayed-decision type meetings and to book the meetings on a case-by-case basis as the proposed time of each meeting occurrence approaches. For each meeting occurrence, program 300 blocks an open timeslot according to specified meeting parameters, determines a set of "best" timeslots to hold the meeting, and books the meeting for a best timeslot. Timeslots that qualify as "best" timeslots are defined according to the organizer's preference. The concept of "best" timeslot is discussed in more detail below, but examples of a best timeslot include: (i) a timeslot that ensures availability of key personnel; (ii) a timeslot in which the most invitees are available according to their calendar data 111, 113; and (iii) a timeslot that meets one or more of the criteria in (i) and (ii), and accommodates the organizer's preferred schedule.

Some embodiments of the present invention recognize the following facts, potential problems and/or potential areas for improvement with respect to the current state of the art: (i) a meeting requestor may want to involve select participants from many different teams, but knows that attendance of the meeting is only desirable and not actually important to many of the participants; (ii) invited participants will most likely skip a desirable meeting, if the scheduled time conflicts with an important meeting; (iii) some of the target participants will likely receive an important meeting request for a conflicting timeslot after accepting the requestor's invitation to a desirable meeting (this is particularly true for a recurring desirable meeting); (iv) the best timeslot known at the time of initiating a meeting request may no longer be the best timeslot when the scheduled time arrives; (v) the best timeslot known at the time of initiating a meeting request may no longer be the best timeslot when the scheduled day arrives; (vi) there should be a scheduling system that fixes meeting timeslots in an agile way, just as content is released in an agile way; (vii) meeting invitees will generally attend recurring meetings provided that higher priority meetings do not conflict in time; and/or (viii) meeting invitees will not likely take the time to resolve the conflicts by countering an accepted meeting with an alternative timeslot or declining previously accepted meetings.

The simple example that follows provides a good context for further understanding of this disclosure. In this example, Organizer has booked a conference room for a sales meeting on every Wednesday 10:30 AM to 11:00 AM for the next six months and invited several colleagues. The invitees have all accepted the sales meeting because each of their respective calendars had no conflicts at the time of receiving the request. One of the participants is made aware of a scheduling conflict by the Monday evening before one of the Wednesday meeting occurrences. The scheduling conflict is present on her calendar. Despite early notice and acceptance, the participant is unable to attend the sales meeting. In this scenario, if the participant, who now has a scheduling conflict, takes the time to decline the individual meeting occurrence on the preceding Monday evening, Organizer may be able to reschedule the meeting for another more suitable time. Rescheduling the sales meeting involves last minute actions including: (i) reserving the required room(s); and (ii) obtaining the required resources. Even when such last minute changes are made successfully, not all of the invitees will tolerate the last minute change to the scheduled meeting.

Some embodiments of the present invention introduce a new meeting type, referred to herein as the delayed decision meeting (DDM). The DDM may be in the form of a recurring meeting or a one-time meeting. Some embodiments of the present invention provide for certain meeting parameters (a form of a meeting dataset) associated with the DDM. A meeting dataset may include, but are not limited to: (i) open timeslots; (ii) meeting duration; (iii) decision point; and/or (iv) suggestion point. The term "open timeslots" refers to a set of timeslots within which the meeting organizer proposes holding a meeting. A single timeslot is the meeting duration specified for a meeting. For example, a meeting organizer may seek a one-time meeting for a duration of one hour on the following Thursday anytime from 9:30 AM to 12:00 PM or from 2:00 PM to 3:30 PM.

The set of timeslots between 9:30 AM and 12:00 PM and between 2:00 PM and 3:30 PM is the "open timeslot." The decision point, also referred to as the decision point condition, is the time and/or date when the calendaring program determines the best timeslot within the open timeslots to book the meeting. For example, if the decision point condition is 6:00 PM, one day prior to the scheduled meeting, when that condition is met, a booking decision will be made, whether by the meeting organizer or automatically by program 300. The suggestion point, also referred to as the suggestion point condition, is the time and/or date when the meeting organizer is provided with a set of best timeslots. That is, when the pre-defined suggestion point condition is met, program 300 provides the meeting organizer with a set of best timeslots. In some embodiments, the suggested timeslots are ranked in order from the closest match to furthest match, where a closest match time, for example, maximizes availability of invited participants. In other embodiments, suggested timeslots are based on: (i) availability of a key participant; (ii) availability of a preferred resource; (iii) the meeting organizer's preferred timeslot(s); (iv) striking a balance between meeting organizer's morning and afternoon meetings to provide non-meeting breaks throughout the day; and/or (v) other meetings on the organizer's calendar, with a focus on grouping meetings together to provide the organizer with preferred non-meeting hours.

Whether recurring or one time meetings, required resources (for example—meeting rooms) will be blocked at the time of initiating the meeting request. However, in some embodiments, the final booking decision (the decision as to the exact time and exact resource(s) to be used for the scheduled meeting) is made automatically at the decision point. Alternatively, the final booking decision is made at the suggestion point. Note that instead of making a final booking decision at the time the meeting invitations are sent, DDMs "block" the participants and/or resources for a proposed timeslot within the open timeslots set up by the meeting organizer.

Once a meeting request is sent to invitees, a thread continues to run at the scheduling server side. The thread has access to participants' calendar data and rooms/resource calendar data. Based on this set of calendar data, the thread processes the DDM requests to determine the best possible timeslot decisions at the suggestion and/or decision points. In practical usage, there is little chance of having a high number of permutations for DDM scheduling. As the meeting time approaches, a final booking decision is made so that the exact time and resource(s) are booked. In some embodiments of the present invention, the calendaring program color codes or otherwise indicates which meetings are "blocked" versus "booked."

Figure 2:
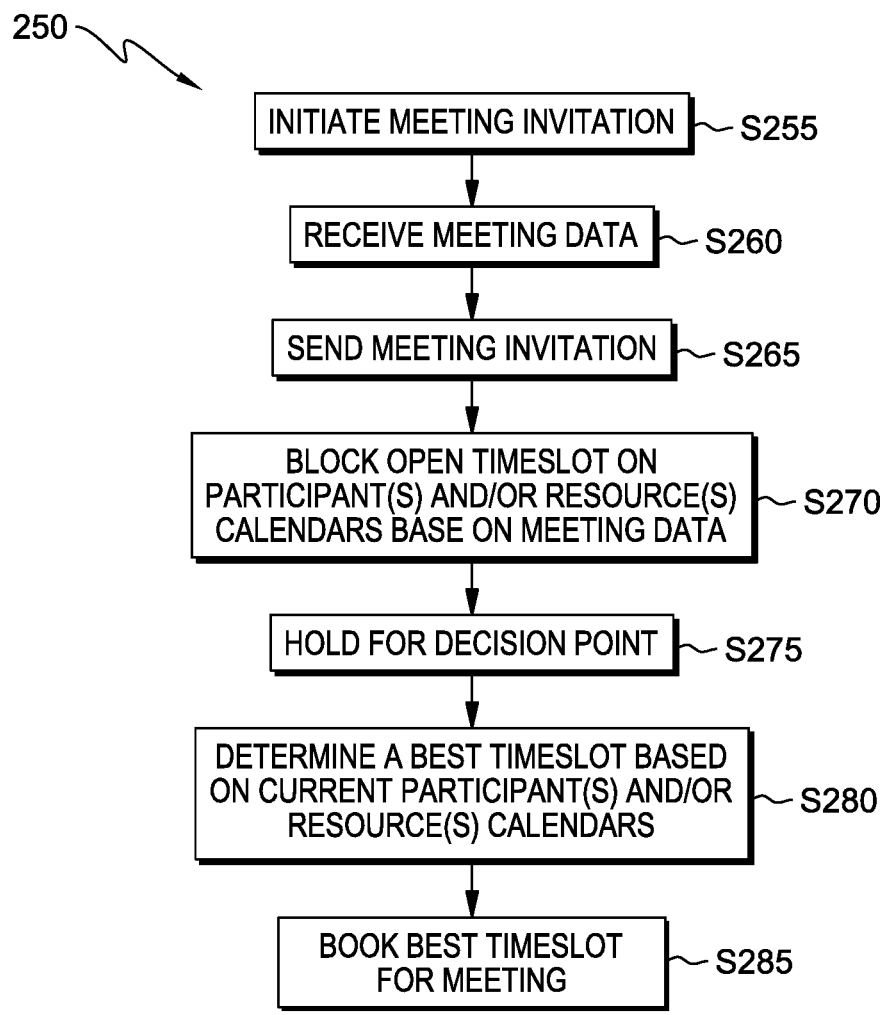
FIG. 2 is a flowchart showing a method performed, at least in part, by the first embodiment system.
Figure 3:
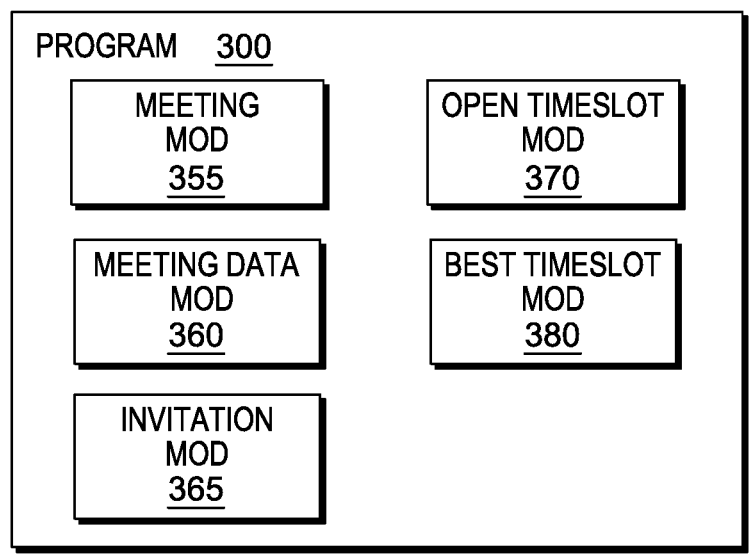
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where a meeting module 355 initiates a meeting invitation. With reference to the above example, Organizer deploys meeting module 355 over network 114 from organizer sub-system 108 to initiate the sales meeting.

Processing proceeds to step S260, where meeting data module 360 receives meeting data from a user. As briefly discussed above, meeting data may include one, or more, of the following: (i) a point in time nearer to the proposed meeting date(s) than the time of the original meeting invitation; (ii) open timeslots; (iii) meeting duration; (iv) decision point; (v) suggestion point; (vi) required resources. Meeting data defines aspects of the meeting that support a delayed booking decision that best matches the meeting preferences of the meeting requester. In the above example, Organizer may specify that the sales meeting may be held anytime on each Wednesday in the "open timeslot" between the hours of 8:00 AM and 12:00 PM over the next 6 months.

Processing proceeds to step S265, where invitation module 365 sends a meeting invitation to the specified invitees and/or resources. The meeting invitation provides the invitee and/or resource with the meeting data necessary to accept or decline the invitation. Specific examples of invitee messages are presented below. Generally, the invitee is informed of the duration of the meeting and the open timeslot and date(s) specified by the meeting requestor.

Processing proceeds to step S270, where open timeslot module 370 blocks the open timeslot in the respective calendars of the: (i) invitee(s) who accepts the meeting invitation; (ii) "participant(s)," and/or (iii) resource(s). The calendars having the blocked open timeslot indicate a potential scheduled meeting for one, or more, timeslots associated with the open timeslot. In this embodiment, the calendar indicates a potential scheduled meeting for the full open timeslot. Alternatively, only a selected timeslot within the open timeslot is indicated on the affected calendar(s). Continuing with the example above, as the invitees accept the sales meeting invitation, access to their respective calendars is given to program 300. With that access, open timeslot module 370 blocks the open timeslot of 8:00 AM and 12:00 PM every Wednesday for the next 6 months for each of the invitees' calendars for which it has access.

Processing proceeds to step S275, where meeting module 355 holds processing until a specified decision time arrives. The decision time is referred to herein as a decision point. In this embodiment, the decision point is pre-determined by the meeting request. Alternatively, the decision point is governed by corporate policy. Alternatively, the decision point is reached on-demand of the meeting organizer instead of being a pre-determined time. The decision point, whether pre-determined or not, is data received as meeting data in step S260. Continuing with the above example, Organizer entered as meeting data in step S260 the decision point to be every Tuesday morning at 10:00 AM before the Wednesday meeting.

Processing proceeds to step S280, where best timeslot module 380 determines a best timeslot based on the accessed calendar data of the participant(s) and/or resource(s). The term "best timeslot" is not to be considered a single timeslot, but there may be any number of best timeslots. In this step, the best timeslot module determines a single timeslot from among a set of best timeslots for booking purposes. In this embodiment, the best timeslot is determined at a specified time in advance of the open timeslots of the proposed meeting. Alternatively, as is discussed in detail below, an interim time, or suggestion point, may be specified where best timeslot module 380 provides a user with a set of best timeslots to select from. When the suggestion point is specified, there will usually be a subsequent decision point specified where the best timeslot module makes a booking decision without user intervention. Continuing with the example presented in the above paragraphs, a participant of the proposed sales meeting becomes aware of a conflicting activity on a Monday evening before one of the Wednesday meeting occurrences. This conflicting activity is recorded in the participant's calendar. Because Organizer specified the decision point as the Tuesday morning before each sales meeting, best timeslot module 380 recognizes the participant's conflicting schedule and makes a best timeslot decision to book the meeting for a time that works around the participant's conflict.

Processing ends at step S285, where meeting module 355 books the best timeslot according to the best timeslot decision made in step S280. In this embodiment, when a meeting is booked, the open timeslot is removed from each accessible calendar and a single timeslot is entered. Booking the best timeslot includes: (i) reserving any conference room for the best timeslot; (ii) reserving any other resources, such as a projector, for the best timeslot; and/or (iii) reserving the best timeslot on the calendar of each participant. Several actions may follow this booking event for the convenience of invitees and/or the organizer. For example, upon booking the meeting, an e-mail may be circulated to all invitees, whether they accepted the original invitation or not, to notify them of the final booked schedule for each meeting occurrence.

Some embodiments of the present invention include both the suggestion point and the decision point. In such cases, the calendaring program includes validation points such that a suggestion point does not arrive at a time later than the decision point. Further, the user may select a suggested timeslot to fix the scheduled meeting, or the user may choose not to fix the meeting, but wait for the decision point, at which time the calendaring program makes the decision by fixing the schedules meeting. In some embodiments, the calendaring program selects what it determines to be the "best" timeslot, as discussed above.

In some embodiments of the present invention, the meeting organizer inputs into the calendaring program certain requirements for resources including: (i) meeting room location; (ii) room capacity; and/or (iii) availability of a projector. At no point in time will the calendaring program allow for over-booking. The calendaring program considers: (i) the duration of requested meetings; and (ii) available meeting rooms. However, the final booking decision for the exact meeting room is made by the calendaring program at the predetermined decision point for that meeting. The final booking decision is based on the specified parameters of the specific occurrence of the meeting being booked. In that way, the meeting requestor, or meeting organizer, will always have a confirmed meeting room that satisfies the requestor's requirements while the exact room remains unknown until the time and/or date of the decision point.

Some embodiments of the present invention set the decision point at an organization level. This may be implemented by a corporate or organization policy. For example, an organization has a policy that final booking decisions on all the DDMs should be made at 6 PM one day prior to the date of the scheduled meeting. In that way, a centralized scheduler is able to make final DDM booking decisions based on static calendar data. In some embodiments, a corporate calendaring program handles the DDM booking decisions. Alternatively, each meeting organizer uses a calendaring program that has access to the schedule of invited meeting participants. Based on the collective scheduling data, the calendaring program determines the "best" timeslot according to the constraints that the meeting requestor has defined. The calendaring program conveys the precise timeslot and resource(s) decided at final booking (for example, booking info determined at the decision point) to the meeting participants through available communication channels, such as e-mail.

Some embodiments of the present invention allow a meeting organizer to override the decision point set at the organization level. For example, at the time of initiating a meeting request, the meeting organizer chooses a decision point that is earlier than what is set at organization level. In that way, the final booking decision for his meeting may be taken two days prior to the scheduled day despite a corporate policy requiring a decision point the day before the scheduled meeting. Generally, the calendaring program has access to more certain scheduling data as the meeting date approaches, than when a recurring meeting is booked, such as six months prior to the meeting date.

Some embodiments of the present invention determine the near-best timeslots with the help of heuristic algorithms. Near-best timeslots include: (i) a timeslot determined by the calendaring program to be "best;" and (ii) other timeslot(s) within the designated "open timeslots." Processing near-best timeslots may be helpful where many organizers schedule DDMs for overlapping open timeslots.

Some embodiments of the present invention provide for invited meeting participants to input meeting preference data. For example, the invitee receives a meeting request with available responses including: (i) accept the meeting; (ii) reject the meeting; (iii) tentatively accept the meeting; and/or (iv) respond to questions regarding the invitee's meeting preferences. Invitee meeting preferences may include one, or more, of the following: (i) whether a potentially conflicting scheduled meeting has priority over the invited meeting; and/or (ii) the priority order for any conflicting or potentially conflicting meetings. In that way, the calendaring program makes informed suggestions and/or decisions. Some embodiments of the present invention include all invitees who have rejected the meeting request (non-participants) in a message that is conveyed at the time of the decision point. This notifies the non-participants of the firm meeting details (for example, meeting time and meeting room) so that they may reconsider attending the meeting. One embodiment presents the message to non-participants in the form of a new meeting request. Other embodiments simply notify the non-participants of the firm meeting details via e-mail, instant message, voice message, etc.

Figure 4:
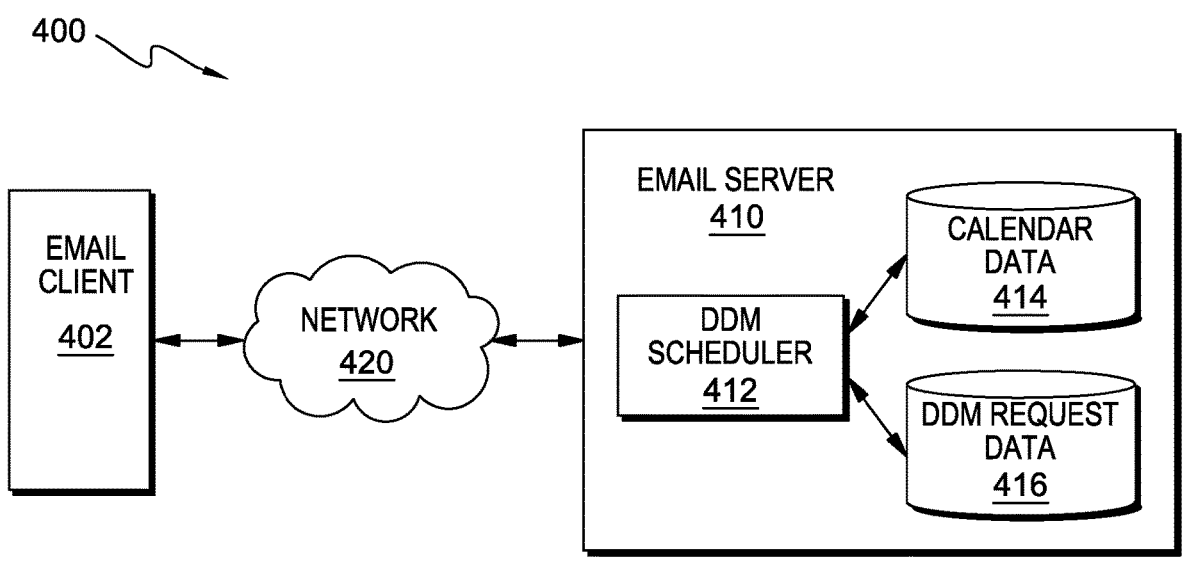
FIG. 4 is a schematic view of a second embodiment of a system according to the present invention.

Use cases and discussions of exemplary processes performed at least in part by networked computers system 400 according to an embodiment of the present invention follows. FIG. 4 depicts networked computers system 400 including: e-mail client sub-system 402, network 420, e-mail server sub-system 410, meeting scheduler 412, calendar data store 414, and delayed decision meeting (DDM) request data store 416.

In a first use case, a meeting organizer wishes to schedule a DDM via e-mail client sub-system 402 over network 420 for one hour every Wednesday for the next 6 months at any time between 10:00 AM to 12:00 PM. DDM request data includes: (i) the meeting room must be at the main office building and must hold 10 participants; and (ii) there must be a projector allocated to the meeting room.

The meeting organizer wants to receive suggestions from scheduler 412 for a "best" timeslot(s) at 6:00 PM every Monday for the coming Wednesday's meeting occurrence. The "best" timeslot suggestions are based on the corresponding meeting request data, in DDM request data store 416, and the calendar data for both the organizer and the participants (invitees having accepted the meeting request), in calendar data store 414. The best timeslot suggestions are ranked from closest match to furthest match, as discussed above. If no suggestion is taken by the organizer, scheduler 412 automatically makes a booking decision based on the closest match ranking at the decision point, which is a time that is pre-determined at the organization level. In this example, the pre-determined decision point is 6:00 PM the day prior to any potential timeslot for the DDM. Alternatively, the decision point is determined by the organizer at the time the meeting request is created. Alternatively, the decision point is based on a global user preference.

Continuing with the example, the main office building location has only two conference rooms. DDM scheduler 412 ensures that not more than four hours of conference room booking is permitted between the hours of 10:00 AM and 12:00 PM for the main office building location. If for any particular week over the six month period being blocked, four hours are already booked, the scheduler asks the organizer to expand and/or change the specified open timeslots. The scheduler allows the organizer to block the meeting for all other occurrences and treat this particular week as an exception with different open timeslots.

Scheduler 412 initiates a suggestion thread at 6:00 PM every Monday by analyzing the availability of all the participants and resources according to their respective calendar data in calendar data store 414 in light of the corresponding DDM request data in data store 416. The scheduler compiles a suggestion list and displays the "best" timeslot suggestions. The meeting organizer receives the suggestion list from scheduler 412 along with a request to decide which, if any, of the suggested timeslots should be used to fix the meeting schedule. If no decision is made before Tuesday at 6:00 PM, the scheduler chooses the best possible timeslot and reports the decision to all of the meeting invitees (including those who declined the meeting request). Alternatively, only those who accept the meeting are notified of the final scheduled meeting.

In a second use case, Architect initiates a weekly meeting on the best architectural practices via email client 402 over network 420. Architect invites 1-2 members from 6-7 different teams to participate in this standard weekly meeting. Upon study of the attendance records of the class, it is noticed that participants for each occurrence of the recurring meeting are not the same. Such data may indicate that invitees have not completely lost interest in the topic of discussion. It is likely that the participants' priorities occasionally change, making attendance of every meeting impossible. In this use case, the meeting organizer knows that the architectural practices meetings are only desirable, but not a priority for most of the participants. The delayed-decision type meeting offers the organizer the flexibility to increase availability of potential attendees by avoiding critical conflicting times. By setting up a DDM using scheduler 412 for this recurring meeting, the organizer is able to specify flexible meeting criteria that is stored in DDM request data store 416. In that way, the scheduler is able to fix the schedule for the weekly meetings at the decision point as each meeting occurrence approaches so that all of the participants may be available.

In a third use case, there is a simplified organization structure having only 25 employees, a company president, and a total of four project teams. Prez is the president of Acme Corporation. Team A has five members, A1, A2, A3, A4, and A5, and one manager, Able. Team B has five members, B1, B2, B3, B4, and B5, and one manager, Baker. Team C has five members, C1, C2, C3, C4, and C5, and one manager, Charlie. Team D has five members, D1, D2, D3, D4, and D5, and one manager, Denise.

On January 1, Prez sends a DDM invitation via email client 402 over the network 420 to four employees, A1, B1, C1 and D1. Each of the four invitees receives the following message along with the DDM invitation, "A 30 minute meeting will be held every Wednesday at any time between 12:00 PM and 5:00 PM for next six months." The invitees who accept the DDM invitation (referred to herein as "participants") have their calendars updated in calendar data store 414 to show the 12:00 PM-5:00 PM timeslot as possibly booked with possibility at 10% (the probability for booking a 30 minute timeslot between 12:00 PM and 5:00 PM is $\frac{1}{10}$). As an alternative, Prez could have specified a default timeslot as well, such as 2:00 PM to 2:30 PM. In that case, participant's calendars show the default timeslot as booked until the time of the decision point.

Acme Corporation has only two meeting rooms that suit the capacity requirements input by Prez. The DDM system ensures that not more than 10 hours of booking is permitted between 12:00 PM and 5:00 PM to ensure that Prez maintains a confirmed meeting room booking for 30 minutes each week regardless of the final timeslot of each weekly meeting occurrence. At the decision point, the DDM scheduler 412 identifies the best timeslot to schedule the meeting based on DDM request data for the meeting and calendar data corresponding to the participants. In this example, "best timeslot" refers to the timeslot when most of the participants are available and a specified room is also available. Those invitees who have accepted the meeting invitation are the ones for which the "best timeslot" is directed. Other non-participating invitees do not have the meeting on their calendars and are not considered when making a "best timeslot" decision. It should be noted that DDM scheduler 412 blocks a guaranteed room and makes a final booking at the decision point.

In a fourth use case, one-on-one meetings are addressed. Emily is an employee at XYZ Corporation. She reports to a personnel manager, Frank, and her production supervisor is Gail. Frank likes to schedule regular one-on-one meetings with those people he is responsible for. Gail frequently needs to set up meetings with her production team on short notice. There exists the chance that Emily will have conflicts between a recurring one-on-one meeting with Frank and occasional one-time team meetings with Gail. Frank takes advantage of the flexibility and automated functionality of a DDM to avoid conflicts with Gail's meetings. He schedules a DDM for each Wednesday over the next 6 months. Frank's included in his DDM request data that he desires a suggestion list every Monday at 10:00 AM for a 30 minute timeslot where he and Emily are available between 12 PM to 5 PM on the following Wednesday. XYZ Corporation has a decision point policy in place for DDMs. All DDMs must have a fixed schedule no later than one day prior to the DDM date at 10:30 AM. When Frank does not chose any suggestion by 10:30 AM the day before the scheduled meeting (the decision point), scheduler 412 automatically fixes a "best" timeslot. As is recognized by the present invention, any scheduling conflict between an important meeting and an urgent meeting is generally resolved by giving priority to the urgent meeting. Accordingly, a meeting requestor, such as Frank, should prefer to have a DDM option for scheduling meetings that are important and not urgent for the invitees.

FIG. 5 is screenshot 500 depicting a DDM request as-viewed by Frank according to an embodiment of the present invention. The screenshot shows the fields selected by Frank and meeting request data entered by Frank into the user interface fields. In this example, Frank is holding the meeting at his office, so he has not selected the "resources" box. Further, XYZ Corporation has a decision point policy in place that requires a decision be made by a specified time.

If Frank wants to move the decision point up, he may do so by selecting the decision point box in the user interface.

In this embodiment, when the suggestion point arrives, a suggestion list will appear to Frank in his Email Client 402 in the form of a popup window. Alternatively, Frank is notified by text message, e-mail message, or phone call. Frank is provided the option to select one of the suggested timeslots to fix the DDM schedule. If Frank does not make a decision regarding the timeslot until reaching the decision point, DDM scheduler 412 makes the decision based on the top rated, or best, timeslot. When the scheduler makes the decision, an email is sent to each invite and the requestor providing the final timeslot and rooms/resources booked for the meeting.

Figure 6:
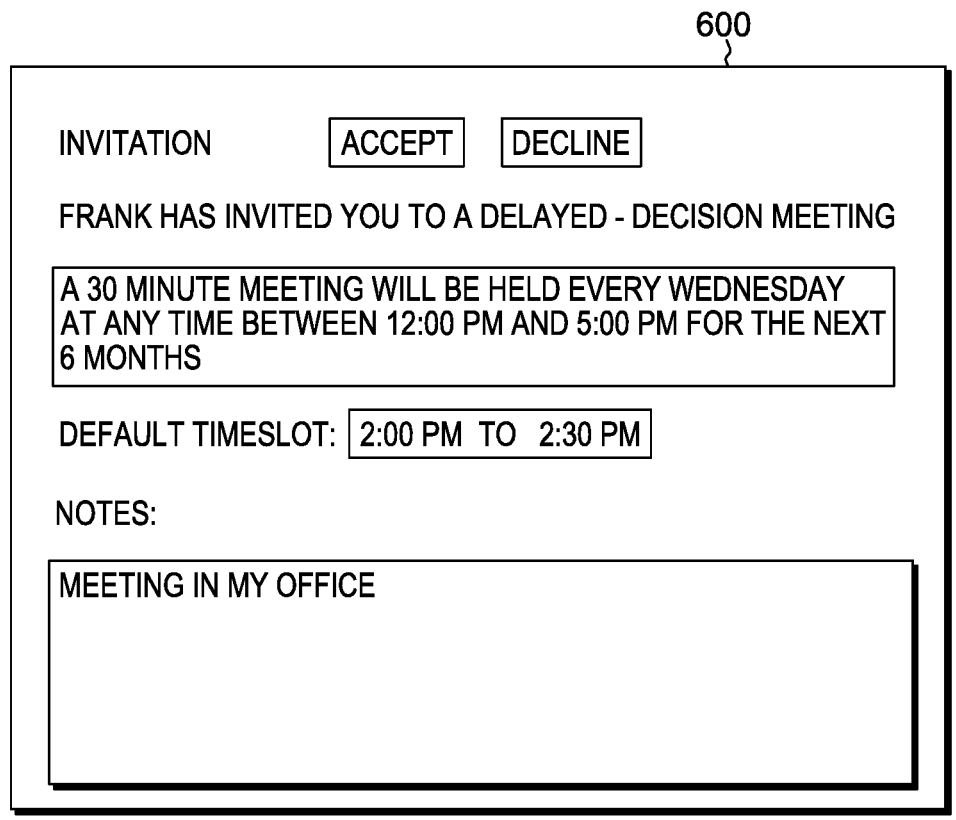
FIG. 6 is a second screenshot according to an embodiment of the present invention.

FIG. 6 is screenshot 600 depicting a DDM request as-viewed by the invitee according to an embodiment of the present invention. The screenshot provides the invitee with a full disclosure as to the duration of the meeting, the date(s) it may be held, and the timeslots that are targeted. In this example, a default timeslot is selected by Frank, so Emily, the invitee, is notified of the initial timeslot of 2:00 PM-2:30 PM each Wednesday for the next 6 months.

When a third party seeking to schedule a meeting reviews Emily's calendar, the third party will see that Emily has a meeting scheduled for 2:00 PM-2:30 PM every Wednesday. Alternatively, and particularly when no default timeslot is selected, the third party may see the hours of 12:00 PM to 5:00 PM blocked for a meeting with a 10% probability. The 10% is determined based on a 5 hour timeslot where only a half hour meeting will be scheduled, that is, 10% of the 5 hours will be needed for the DDM to be scheduled. In some embodiments of the present invention, the user's calendar displays a visual indicator of, for example, a red color over a booked timeslot and displays a light red color for an open timeslot (in this example: 12:00 PM to 5:00 PM). Additionally, the degree of red may indicate the probability of there being a meeting during the open timeslot. For example, an open timeslot having a 10% probability of a meeting is shown in very light red, while the same timeslot having a 40% probability of a meeting is shown in a medium shade of red. In that way, the shade of red changes based on the cumulative probability for all DDM meetings scheduled during a particular open timeslot.

Some embodiments of the present invention may include one, or more, of the following features, characteristics and/or advantages: (i) makes best-timeslot decisions iteratively for a scheduled meeting according to availability factors; (ii) provides suggested time-slots for a scheduled meeting to a meeting scheduler based on availability factors; (iii) applies to recurring meetings; (iv) applies to one-time meetings; (v) ensures guaranteed room(s) and/or resource(s) for each scheduled meeting; (vi) provides target range of meeting times with meeting invitations; (vii) provides target range of meeting dates with meeting invitations; (viii) updates the calendars of invitees when meeting schedule is fixed; (ix) accesses calendars of invitees who have accepted the meeting to determine their availability; (x) publishes the availability of invitees who have accepted the meeting; (xi) allows a meeting organizer to set a decision point for each meeting request; (xii) allows a meeting organizer to set a suggestion point for each meeting request; (xiii) processes meeting requests having open timeslots in which a scheduled meeting may be held; (xiv) operates to auto-resolve scheduling conflicts that arise as the meeting time approaches; (xv) breaks the scheduling process into two steps to minimize the conflicts, that is, first "blocking" the room(s)/resource(s) and second making the final scheduling decision by "booking" the room(s)/resource(s); (xvi) provides for a floating meeting that takes available timeslots iteratively for each occurrence of the floating meeting near the day/time of the meeting; (xvii) communicates the fixed meeting time and/or place with an invitee who declined the meeting invitation so the invitee may attend the meeting if no longer conflicted; and/or (xviii) an e-mail server holds the data of decision points and suggestion points for the delayed decision meetings requested by users.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Timeslot: a single contiguous time range.

Open timeslot: a set of timeslots, the set of timeslots may or may not include contiguous timeslots and may include more than one date. An open timeslot may represent, for example, all potential meeting times for a floating meeting.

What is claimed is:

1. A computer-implemented method comprising:
receiving a meeting dataset for a proposed meeting, the meeting dataset including a pre-defined period before an earliest timeslot of the proposed meeting, a meeting duration, and a plurality of timeslots including the earliest timeslot, each timeslot of the plurality of timeslots having an individual duration equal to the meeting duration;
responsive to a user accepting a meeting invitation for the proposed meeting, tentatively booking the plurality of timeslots in a calendar associated with the user;
automatically accessing the calendar associated with the user at the pre-defined period before an earliest timeslot of the proposed meeting;
responsive to accessing the calendar, determining a set of available timeslots from the tentatively booked plurality of timeslots on the calendar; and
finally booking a single timeslot from the set of available timeslots at the pre-defined period, wherein the pre-defined period is a fixed time and date before the earliest of the timeslots.

2. The method of claim 1 further comprising:
responsive to meeting a suggestion point condition, automatically providing to a meeting organizer a plurality of suggested single timeslots from the plurality of timeslots based, at least in part, on the set of available timeslots.

3. The method of claim 1 wherein tentatively booking the plurality of timeslots includes determining a probability that a single timeslot within the plurality of timeslots will be booked.

4. The method of claim 1 wherein the meeting dataset includes one of the following pieces of data: decision point and suggestion point.

5. The method of claim 1 wherein the automatically accessing step is responsive to user input prior to the earliest timeslot of the plurality of timeslots.

6. The method of claim 1 wherein the step of finally booking the single timeslot includes:
cancelling the tentative booking of timeslots in the invitee calendar other than the single timeslot.

7. A computer program product comprising a computer-readable storage medium having a set of instructions stored therein which, when executed by a processor, causes the processor to schedule a meeting by:
receiving a meeting dataset for a proposed meeting, the meeting dataset including a pre-defined period before an earliest timeslot of the proposed meeting, a meeting duration, and a plurality of timeslots including the earliest timeslot, each timeslot of the plurality of timeslots having an individual duration equal to the meeting duration;
responsive to a user accepting a meeting invitation for the proposed meeting, tentatively booking the plurality of timeslots in a calendar associated with the user;
automatically accessing the calendar associated with the user at the pre-defined period before an earliest timeslot of the proposed meeting;
responsive to accessing the calendar, determining a set of available timeslots from the tentatively booked plurality of timeslots on the calendar; and
finally booking a single timeslot from the plurality of timeslots on the calendar based on the set of available timeslots at the pre-defined period, wherein the pre-defined period is a fixed time and date before the earliest of the timeslots.

8. The computer program product of claim 7 wherein the processor is further caused to:
responsive to meeting a suggestion point condition, automatically provide to a meeting organizer a plurality of suggested single timeslots from the plurality of timeslots based, at least in part, on the set of available timeslots.

9. The computer program product of claim 7 wherein tentatively booking the plurality of timeslots includes determining a probability that a single timeslot within the plurality of timeslots will be booked.

10. The computer program product of claim 7 wherein the meeting dataset includes one of the following pieces of data: decision point and suggestion point.

11. The computer program product of claim 7 wherein the automatically accessing step is responsive to user input prior to the earliest timeslot of the plurality of timeslots.

12. The computer program product of claim 7 wherein the step of finally booking the single timeslot includes:
cancelling the tentative booking of timeslots in the invitee calendar other than the single timeslot.

13. A computer system, comprising:
a processor set; and
a computer readable storage medium;
wherein:
the processor set is structured, located, connected and/or programmed to run program instructions stored on the computer readable storage medium; and
the program instructions which, when executed by the processor set, cause the processor set to schedule a meeting by:
receiving a meeting dataset for a proposed meeting, the meeting dataset including a pre-defined period before an earliest timeslot of the proposed meeting, a meeting duration, and a plurality of timeslots including the earliest timeslot, each timeslot of the plurality of timeslots having an individual duration equal to the meeting duration;
responsive to a user accepting a meeting invitation for the proposed meeting, tentatively booking the plurality of timeslots in a calendar associated with the user;
automatically accessing the calendar associated with the user at the pre-defined period before an earliest timeslot of the proposed meeting;
responsive to accessing the calendar, determining a set of available timeslots from the tentatively booked plurality of timeslots on the calendar; and
finally booking a single timeslot from the plurality of timeslots on the calendar based on the set of available timeslots at the pre-defined period, wherein the pre-defined period is a fixed time and date before the earliest of the timeslots.

14. The computer system of claim 13 wherein the processor is further caused to:
responsive to meeting a suggestion point condition, automatically provide to a meeting organizer a plurality of suggested single timeslots from the plurality of timeslots based, at least in part, on the set of available timeslots.

15. The computer system of claim 13 wherein tentatively booking the plurality of timeslots includes determining a probability that a single timeslot within the plurality of timeslots will be booked.

16. The computer system of claim 13 wherein the meeting dataset includes one of the following pieces of data: decision point and suggestion point.

17. The computer system of claim 13 wherein the automatically accessing step is responsive to user input prior to the earliest timeslot of the plurality of timeslots.

18. The computer system of claim 13 wherein the step of finally booking the single timeslot includes:
cancelling the tentative booking of timeslots in the invitee calendar other than the single timeslot.

* * * * *